United States Patent
Kageyama et al.

(10) Patent No.: US 8,233,105 B2
(45) Date of Patent: Jul. 31, 2012

(54) IMAGE DISPLAY DEVICE

(75) Inventors: Hiroshi Kageyama, Hachioji (JP); Futoshi Furuta, Kokubunji (JP); Ken Takei, Kawasaki (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 789 days.

(21) Appl. No.: 12/417,898

(22) Filed: Apr. 3, 2009

(65) Prior Publication Data

US 2009/0251453 A1 Oct. 8, 2009

(30) Foreign Application Priority Data

Apr. 3, 2008 (JP) ................................. 2008-097046

(51) Int. Cl.
*G02F 1/1343* (2006.01)
*G06F 3/038* (2006.01)
(52) U.S. Cl. ........... 349/39; 349/139; 349/147; 345/211
(58) Field of Classification Search ..................... 349/39, 349/139, 147; 345/211
See application file for complete search history.

(56) References Cited

U.S. PATENT DOCUMENTS 7,492,361 B2 * 2/2009 Kawachi et al. .............. 345/204

FOREIGN PATENT DOCUMENTS

JP 2005-301219 10/2005

* cited by examiner

*Primary Examiner* — Mike Qi
(74) *Attorney, Agent, or Firm* — Antonelli, Terry, Stout & Kraus, LLP.

(57) ABSTRACT

In order to restrain increase in frame area caused along with a larger number of channels to a minimum, there is provided an image display device that adopts a communication method in which a signal is transmitted/received with the use of electrostatic capacitance coupling. A first board includes: a tabular first power supply line, a tabular second power supply line, a semiconductor element, and a tabular first electrode group. A second board includes: a tabular second electrode group and a tabular common electrode. In a state where the first board and the second board are laid on each other, the first electrode group overlaps the second electrode group while one of the first power supply line and the second power supply line overlaps the common electrode.

11 Claims, 7 Drawing Sheets

Prior Art

FIG.7A

Prior Art

IMAGE DISPLAY DEVICE

CROSS-REFERENCE TO RELATED APPLICATION

The present application claims priority from Japanese application JP 2008-097046 filed on Apr. 3, 2008, the content of which is hereby incorporated by reference into this application.

BACKGROUND OF THE INVENTION

1. Field of the Invention

The present invention relates to an image display device, and more particularly, to a technology that is effective in transmitting/receiving display data via a non-contact transmission path.

2. Description of the Related Art

In an active matrix display device typified by a liquid crystal display device, a thin film transistor (hereinafter, referred to as TFT) constituting an active element is formed in each pixel. Display information is stored in each pixel, whereby an image is displayed.

On the other hand, a TFT having the following structure is called a poly-silicon TFT. That is, an amorphous silicon film is poly-crystallized by laser annealing, and a poly-silicon film having a mobility enhanced to approximately 100 $cm^2/V \cdot s$ is used as a semiconductor layer.

A circuit including such a poly-silicon TFT operates in response to a signal having several MHz to several tens MHz at maximum. Therefore, in addition to pixels, a data driver circuit for generating an image signal and a scanning circuit for performing scanning can also be formed in the same process as TFTs constituting pixels on a board of the liquid crystal display device or the like.

Further, as a communication method in which a signal (such as display data or display control signal) is transmitted/received via a non-contact transmission path, there is known a communication method employing electrostatic induction (electrostatic capacitance coupling), electromagnetic induction, or an electromagnetic wave.

Among communication methods in which a signal is transmitted/received via the non-contact transmission path, the communication method employing an electromagnetic wave or electromagnetic induction is more suitable for a long-distance communication. However, in that method, a display signal needs to be modulated and demodulated with the use of a carrier wave having a frequency by far higher than a transmission rate of the display signal. This leads to increase in power consumed by high-speed circuit driving or increase in area for a circuit element formation.

On the other hand, in the communication method employing electrostatic capacitance coupling as illustrated in FIG. 5 of Patent Document 1, a communication is limited to a shorter distance transmission. However, the method can be realized only with transmission electrodes because modulation and demodulation are not necessary. In addition, an area occupied by the electrodes can be kept small because circuits for modulation and demodulation are not necessary.

However, in order to increase a transmission rate for higher resolution, a plurality of non-contact transmission paths are required. Specifically, electrodes for electrostatic capacitance coupling need to be arranged in parallel on a board.

Figure 7A:
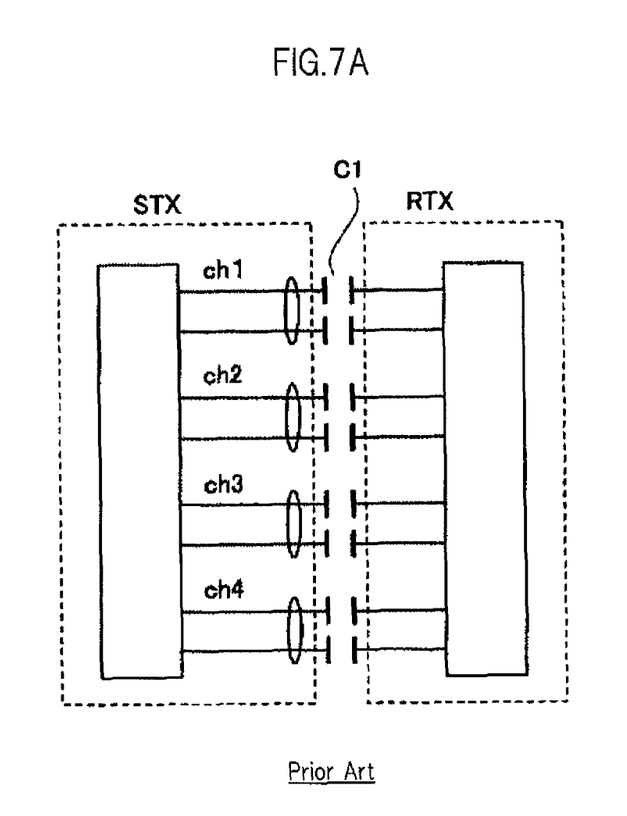
FIGS. 7A and 7B are diagrams for describing conventional examples of a non-contact transmission path.
Figure 7B:
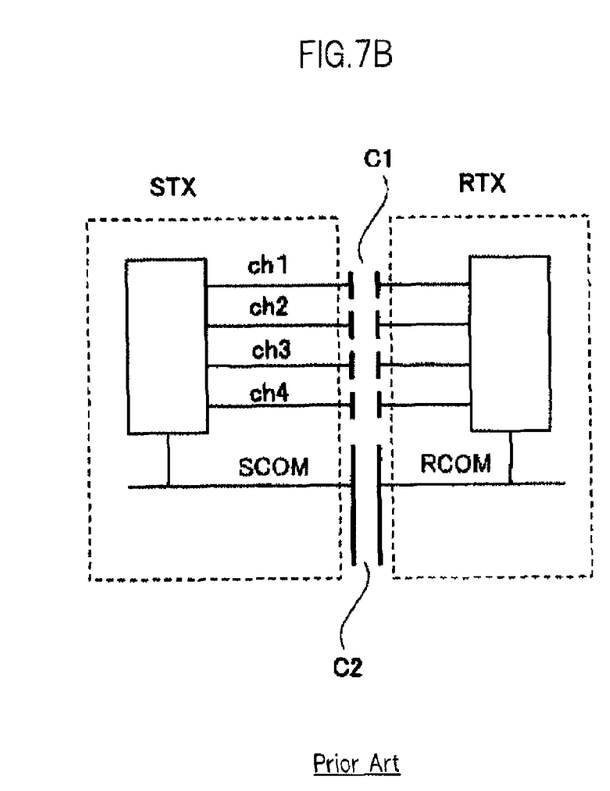

As methods for realizing the plurality of non-contact transmission paths, there are known a balanced transmission illustrated in FIG. 7A and a non-balanced transmission illustrated in FIG. 7B. In FIGS. 7A and 7B, reference symbols STX and RTX denote a transmitting circuit and a receiving circuit, respectively.

In the balanced transmission illustrated in FIG. 7A, two capacitors (C1) are provided for one channel (ch) In the non-balanced transmission illustrated in FIG. 7B, one capacitor (C1) is provided for one channel (ch), and a capacitor (C2) having sufficient capacitance for all the channels is provided in order to alternately short-circuit between reference voltages (SCOM and RCOM) of the transmitting circuit (STX) and the receiving circuit (RTX). In short, more than one electrode needs to be provided for one channel.

When the plurality of non-contact transmission paths are employed in order to increase the transmission rate for higher resolution, the electrodes occupy a large area on a panel, and a non-display region called a frame is enlarged. A larger non-display region as described above is not desirable because flexibility of an application product is decreased.

SUMMARY OF THE INVENTION

The present invention has been made in order to solve the above-mentioned problems, and an object of the present invention is therefore to provide a technology that enables restraining increase in frame area caused along with a larger number of channels to a minimum, in an image display device that adopts a communication method in which a signal is transmitted/received with the use of electrostatic capacitance coupling.

(1) An image display device according to the present invention includes: a display panel including a plurality of pixels; and a second board. The display panel includes a first board that is arranged so as to overlap the second board. The first board includes: a tabular first power supply line to which a voltage having a first voltage level is supplied; a tabular second power supply line to which a voltage having a second voltage level that is different from the first voltage level is supplied; a semiconductor element connected to the first power supply line and the second power supply line; and a tabular first electrode group for transmitting/receiving a signal through electrostatic induction. The second board includes: a tabular second electrode group for transmitting/receiving a signal through electrostatic induction; and a tabular common electrode to which a reference voltage of the signal is supplied. In a state where the first board and the second board are laid on each other, the first electrode group overlaps the second electrode group while one of the first power supply line and/or the second power supply line overlaps the common electrode.

(2) In the image display device according to Item (1), the first board includes a capacitor formed between the first power supply line and the second power supply line.

(3) In the image display device according to Item (2), the capacitor is a parallel capacitor in which a first capacitor and a second capacitor are connected in parallel to each other. The first capacitor is formed by a semiconductor layer connected to one of the first power supply line and the second power supply line and a gate electrode layer connected to another one of the first power supply line and the second power supply line. The second capacitor is formed by a metal layer for wiring including one of the first power supply line and the second power supply line and a gate electrode layer connected to another one of the first power supply line and the second power supply line.

(4) In the image display device according to any one of Item (1) to Item (3), the display panel is an active matrix display panel.

(5) In the image display device according to any one of Item (1) to Item (4), the semiconductor element included in the first board is a thin film transistor using poly-silicon as a semiconductor layer.

(6) In the image display device according to any one of Item (1) to Item (5), the display panel is one of a liquid crystal display panel, an organic EL display panel, and a memory display device.

(7) In the image display device according to any one of Item (1) to Item (6), the first board includes a driver circuit for driving the plurality of pixels, and the first power supply line and the second power supply line are a first power supply line for the driver circuit and a second power supply line for the driver circuit, respectively.

(8) In the image display device according to any one of Item (1) to Item (6), each of the plurality of pixels includes a pixel circuit formed on the first board, and the first power supply line and the second power supply line are a first power supply line for the pixel circuit and a second power supply line for the pixel circuit, respectively.

(9) In the image display device according to any one of Item (1) to Item (8), the first power supply line is a positive power supply line, and the second power supply line is a negative power supply line.

According to the present invention, in the image display device that adopts the communication method in which a signal is transmitted/received with the use of electrostatic capacitance coupling, the increase in frame area caused along with the larger number of channels can be restrained to the minimum.

DETAILED DESCRIPTION OF THE INVENTION

Hereinafter, an embodiment of the present invention is described in detail with reference to the attached drawings.

It should be noted that components having the same function are denoted by the same reference symbol and repeated description thereof is omitted in all the drawings for describing the embodiment.

Figure 1:
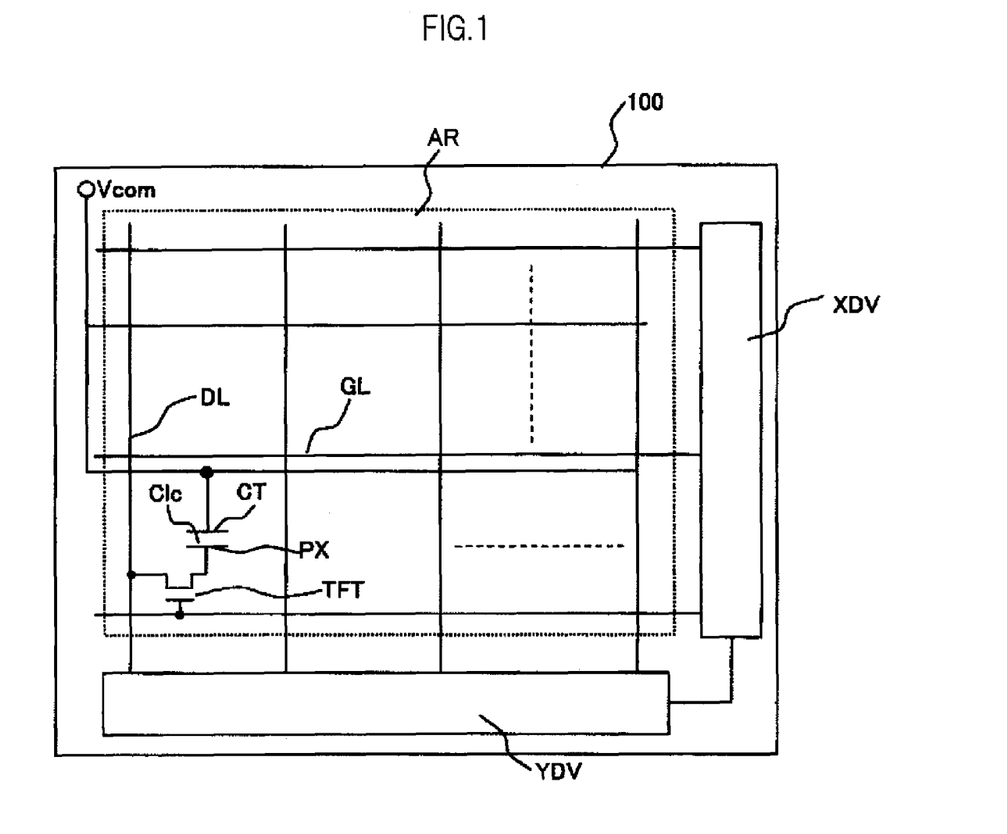
FIG. 1 is a circuit diagram illustrating an equivalent circuit of a liquid crystal display panel included in a liquid crystal display device according to an embodiment of the present invention.

FIG. 1 is a circuit diagram illustrating an equivalent circuit of a liquid crystal display panel included in a liquid crystal display device according to the embodiment of the present invention.

In FIG. 1, reference numeral 100 denotes a panel board (also referred to as TFT board or active matrix board), and reference symbol AR denotes a display region. Within the display region (AR), pixels are formed in matrix. Each pixel includes a pixel electrode (PX) and a thin film transistor (TFT) for applying an image signal to the pixel electrode (PX). The thin film transistor (TFT) is formed of a poly-silicon TFT. That is, in the thin film transistor (TFT), an amorphous silicon film is poly-crystallized by laser annealing, and a poly-silicon film having a mobility enhanced to approximately 100 $cm^2/V \cdot s$ is used as a semiconductor layer.

A gate electrode of the thin film transistor (TFT) in a row direction is connected to a scanning line (GL). The scanning line (GL) is connected to a scanning circuit (XDV).

A drain electrode of the thin film transistor (TFT) in a column direction is connected to an image line (DL). The image line (DL) is connected to a data processing circuit (YDV).

A source electrode of the thin film transistor (TFT) is connected to the pixel electrode (PX). Here, liquid crystal (LC) is held between the pixel electrode (PX) and a counter electrode (CT), and hence liquid crystal capacitor (Clc) is equivalently formed between the pixel electrode (PX) and the counter electrode (CT).

The source electrode and the drain electrode can be opposite in accordance with a direction in which bias is applied. Here, the electrode connected to the image line (DL) is called the drain electrode.

A transistor formed in the scanning circuit (XDV) and a transistor formed in the data processing circuit (YDV) are also formed of a poly-silicon TFT. The transistor formed in the scanning circuit (XDV) and the transistor formed in the data processing circuit (YDV) are formed simultaneously in the same step as the step of forming the thin film transistor (TFT) in the display region (AR).

The scanning circuit (XDV) sequentially supplies a selection voltage (scanning signal) of "High" level to the respective scanning lines (GL) for one horizontal scanning period based on a reference clock generated inside the scanning circuit (XDV). As a result, the plurality of thin film transistors (TFT) connected to the respective scanning lines (GL) of the liquid crystal display panel electrically connect the image lines (DL) and the pixel electrodes (PX) during one horizontal scanning period.

The data processing circuit (YDV) outputs to the image line (DL) a gray level voltage corresponding to a gray level to be displayed by the pixel.

When the thin film transistor (TFT) is in an on-state (electrically connected), the gray level voltage (image signal) is supplied to the pixel electrode (PX) from the image line (DL).

After that, when the thin film transistor (TFT) is in an off-state, the gray level voltage based on the image to be displayed by the pixel is retained in the pixel electrode (PX).

A common voltage (Vcom) is applied to the counter electrode (CT). A potential difference between the pixel electrode (PX) and the counter electrode (CT) changes an orientation direction of liquid crystal molecules held therebetween, and light transmittance and light reflectance accordingly changes, whereby the liquid crystal display panel displays an image.

Figure 2:
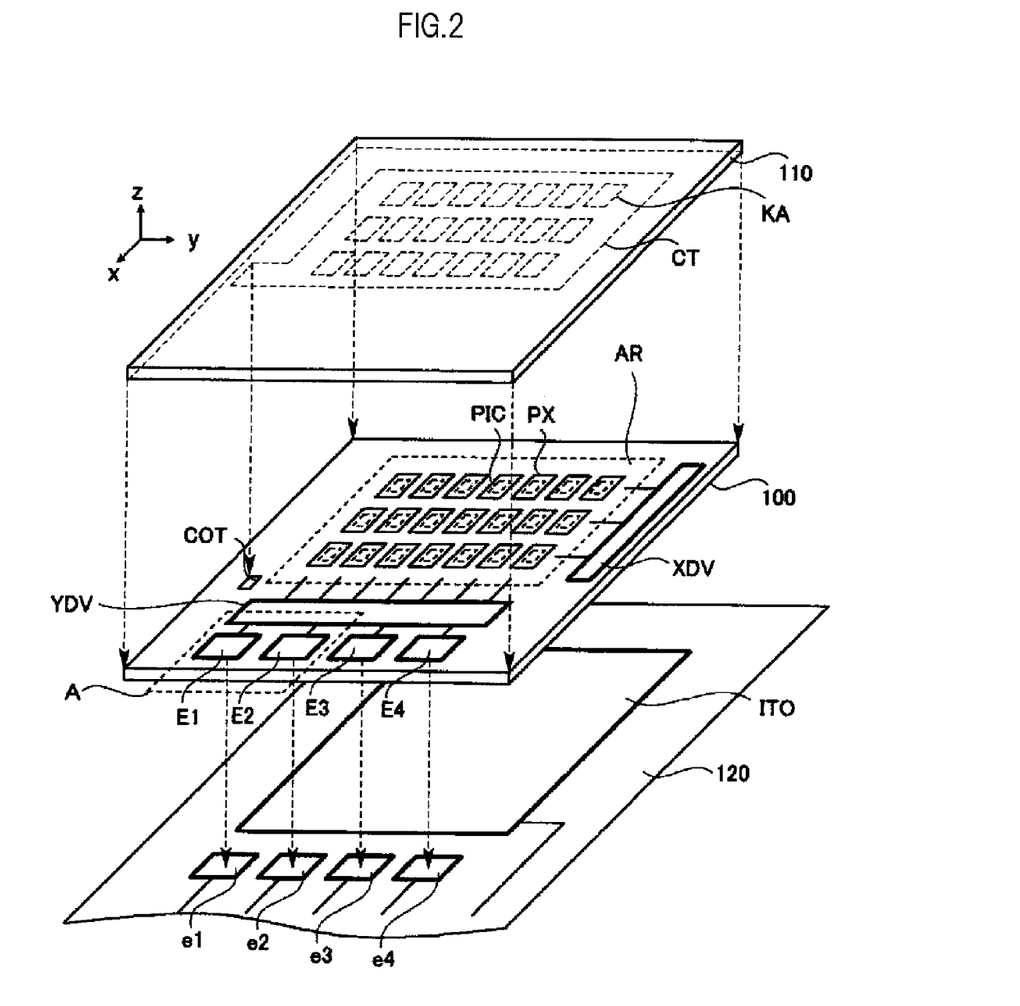
FIG. 2 is a block diagram illustrating a schematic structure of the liquid crystal display device according to the embodiment of the present invention.

FIG. 2 is a block diagram illustrating a schematic structure of the liquid crystal display device according to the embodiment of the present invention.

FIG. 2 illustrates a structure of a transmission board and a liquid crystal display panel. The transmission board transmits a signal (such as display data or display control signal) via a non-contact transmission path (channel utilizing electrostatic capacitance coupling), and the liquid crystal display panel realizes receiving the transmitted signal.

In FIG. 2, a non-balanced transmission using a four-channel non-contact transmission path is assumed. It should be noted that the number of the channels "four" is determined merely for easy description and has no particular significance. In practice, the number of the channels may be more than or less than four.

As illustrated in FIG. 2, the liquid crystal display panel according to this embodiment is structured in the following manner. A panel board 100 provided with the pixel electrodes (PX) and the thin film transistors (TFT) and a counter board 110 on which a color filter and the like are formed are laid on each other with a predetermined space therebetween. A seal member is applied in a frame-like shape in the vicinity of a peripheral portion of the space between the panel board 100 and the counter board 110 so as to bond the both boards 100 and 110. Liquid crystal is charged into an inner side of the seal member applied between the panel board 100 and the counter board 110 through a liquid crystal charging port provided in a part of the seal member, and is sealed. Further, polarizing plates are attached to outer surfaces of the panel board 100 and the counter board 110.

As described above, a liquid crystal display module according to this embodiment has a structure in which liquid crystal is held between a pair of boards.

The panel board 100 and the counter board 110 are structured to have the same area. A material of the board is not limited to glass but may be plastic or the like as long as the material has insulating properties. In the case of the liquid crystal display panel using a twisted nematic (TN) method or a vertical alignment (VA) method as in this embodiment, the counter electrode (CT) is provided on a counter board 110 side. On the other hand, in the case of a liquid crystal display panel using an in-plane-switching (IPS) method, the counter electrode (CT) is provided on a panel board 100 side.

The present invention does not directly relate to an inner structure of the liquid crystal panel, and hence detailed description of the inner structure of the liquid crystal panel is omitted. In addition, the present invention is applicable to any type of liquid crystal panels irrespective of the structure thereof.

In FIG. 2, as described above, the panel board 100 including a glass board is provided with the display region (AR) for displaying an image, and in the display region (AR), the pixel electrodes (PX) are formed in matrix. Below each of the pixel electrodes (PX), a pixel circuit (PIC) is formed of the thin film transistor. The pixel circuit (PIC) outputs a voltage to the pixel electrode (PX) according to the stored voltage. As illustrated in FIG. 1, the pixel circuit (PIC) is formed of one thin film transistor (TFT) in some cases. In other cases, a dynamic memory circuit and a static memory circuit are formed of a plurality of thin film transistors.

In a peripheral portion (non-display region) of the display region (AR), the scanning circuit (XDV) and the data processing circuit (YDV) each for driving the pixel circuits (PIC), and electrodes (E1 to E4) for non-contact communication using electrostatic capacitance coupling are formed.

The panel board 100 is bonded to the counter board 110 including another glass board, whereby the panel board 100 and the counter board 110 hold the liquid crystal (LC) having a thickness of several μm therebetween. The thickness of the liquid crystal is kept constant by applying spherical beads to a glass board (SUB1).

The transparent counter electrode (CT) is formed on an inner surface of the counter board 110. The liquid crystal (LC) is held between the counter electrode (CT) and the pixel electrodes (PX), whereby the liquid crystal display panel is formed. A connection terminal (COT) provided on the panel board 100 is connected to the counter electrode (CT). For example, a fixed voltage of the common voltage (Vcom) is supplied to the counter electrode (CT).

At positions on the inner surface of the counter board 110, which overlap the positions of the pixel electrodes (PX), opening portions (KA) are provided. A light-shielding layer (so-called black matrix) is applied to a region other than the opening portions so that light is not transmitted through the region other than the opening portions. When color filters for respective colors of red, green, and blue are provided in the opening portions (KA), the image display device can display a color image.

The polarizing plate (not shown) and a phase difference plate (not shown) are attached to the outer surface of the counter board 110. In addition, the polarizing plate is also attached to the outer surface of the panel board 100.

The polarizing plates and the phase difference plate function such that the ratios of light reflectance are made significantly different from each other and that a bright display and a dark display can be visually observed when different alternating voltage amplitudes are applied to the liquid crystal.

In this embodiment, on a transmission board 120 for transmitting a signal (such as display data or display control signal) to the panel board 100, electrodes (e1 to e4) for non-contact communication and a common electrode (ITO) are formed.

The electrodes (e1 to e4) overlap the electrodes (E1 to E4) of the panel board 100, thereby forming the non-contact transmission path utilizing electrostatic capacitance coupling. In this case, the common electrode (ITO) is arranged so as to overlap the pixel circuits (PIC), the scanning circuit (XDV), and the data processing circuit (YDV), which are provided on the panel board 100.

Figure 3:
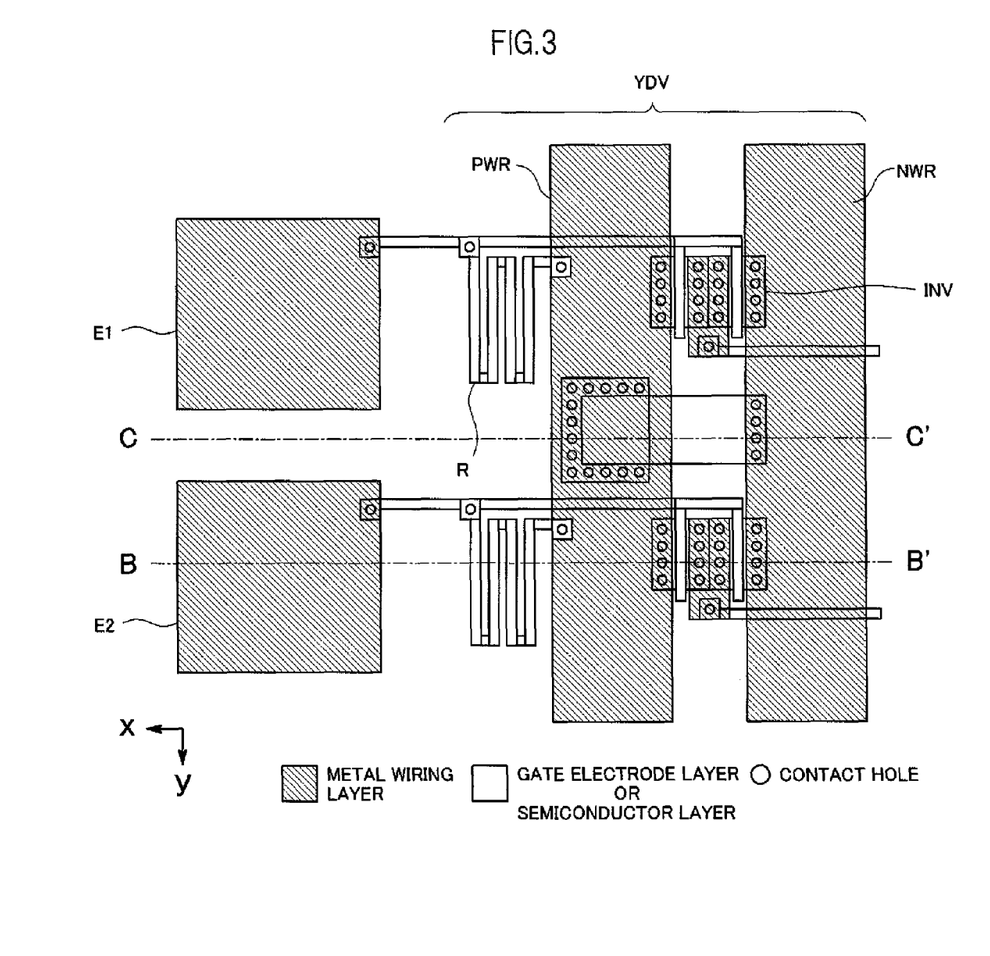
FIG. 3 is a diagram illustrating a circuit pattern of a region A of FIG. 2.

FIG. 3 is a diagram illustrating a circuit pattern of a region A of FIG. 2, and illustrates the electrodes (E1 and E2) and a part of the data processing circuit (YDV). In FIG. 3, reference symbol R denotes a resistor.

A square marked with diagonal lines represents a metal wiring layer in which an electrode, a power supply line, and other wiring are formed. A plain square represents a semiconductor layer (AS) in which a thin film transistor is to be formed and a gate electrode layer (GT). A plain circle represents a contact hole for two overlapping layers.

Figure 4:
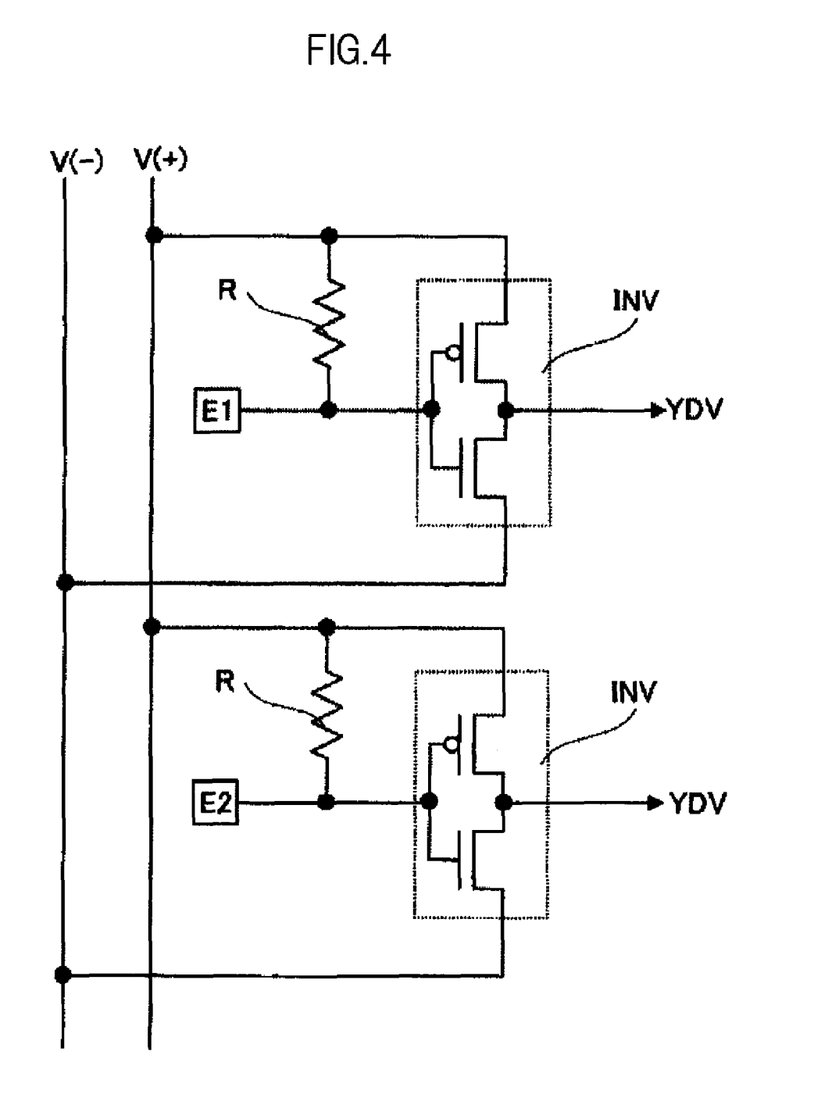
FIG. 4 is a circuit diagram illustrating an equivalent circuit of the circuit pattern of FIG. 3.

FIG. 4 is a circuit diagram illustrating an equivalent circuit of the circuit pattern of FIG. 3. In FIG. 4, reference symbol V(+) denotes a voltage of a positive power supply line (PWR), and reference symbol V(−) denotes a voltage of a negative power supply line (NWR).

As illustrated in FIG. 4, in the circuit pattern of FIG. 3, a signal received by the electrode (E1 or E2) is output to the data processing circuit (YDV) via an inverter (INV) In this way, the metal wiring layer, the semiconductor layer (AS), and the gate electrode layer (GT), which are formed on the panel board 100, are utilized to provide active circuit elements represented by the inverter (INV) inside the data processing circuit (YDV).

In order to supply power to such active circuit elements, the positive power supply line (PWR) and the negative power supply line (NWR) are provided with the use of the metal wiring layer.

Figure 5:
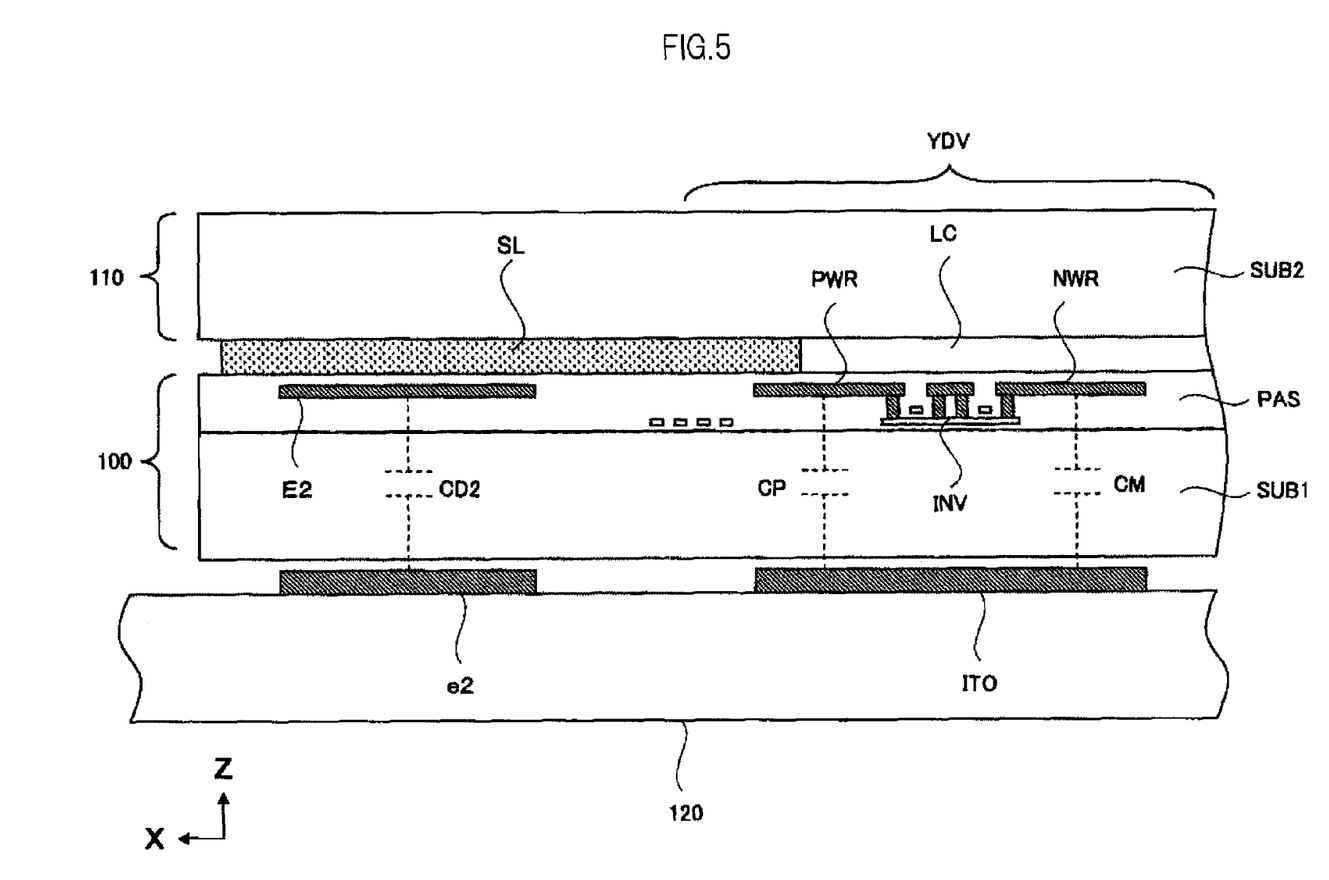
FIG. 5 is a cross sectional diagram illustrating a cross sectional structure of a main part, which is taken along a line B-B' of FIG. 3.

FIG. 5 is a cross sectional diagram illustrating a cross sectional structure of a main part, which is taken along a line B-B' of FIG. 3. Specifically, FIG. 5 illustrates the cross sectional structure of the main part of each of the panel board 100, the counter board 110, and the transmission board 120, which is taken along the line B-B' of FIG. 3.

As illustrated in FIG. 5, the counter board 110 and the panel board 100 are bonded to each other through a seal member (adhesive layer) (SL). Here, the seal member (SL) is applied so as to surround the panel board 100 on the peripheral portion thereof, and seals the liquid crystal (LC). In FIG. 5, reference symbols SUB1, SUB2, and PAS denote the glass board of the panel board 100, the glass board of the counter board 110, and an insulating layer, respectively.

The electrode (e2) provided on the transmission board 120 is arranged so as to overlap the electrode (E2) provided on the panel board 100, thereby forming a capacitor (CD2).

In the same manner, the electrodes (e1, e3, and e4) provided on the transmission board 120 are arranged so as to overlap the electrodes (E1, E3, and E4) provided on the panel board 100, thereby forming capacitors (CD1, CD3, and CD4), respectively.

The common electrode (ITO) provided on the transmission board 120 overlaps the positive power supply line (PWR) and the negative power supply line (NWR), which are provided on the panel board 100, thereby forming capacitors (CP and CM), respectively.

The pixel circuit (PIC) and the scanning circuit (XDV) have the same cross sectional structure in the above-mentioned main part as the data processing circuit (YDV). Active elements constituting the pixel circuit (PIC) and the scanning circuit (XDV), and the positive power supply line and the negative power supply line for supplying a power supply voltage to the active elements are formed on the panel board. In addition, the common electrode is arranged so as to overlap the portion in which those components are formed.

Figure 6:
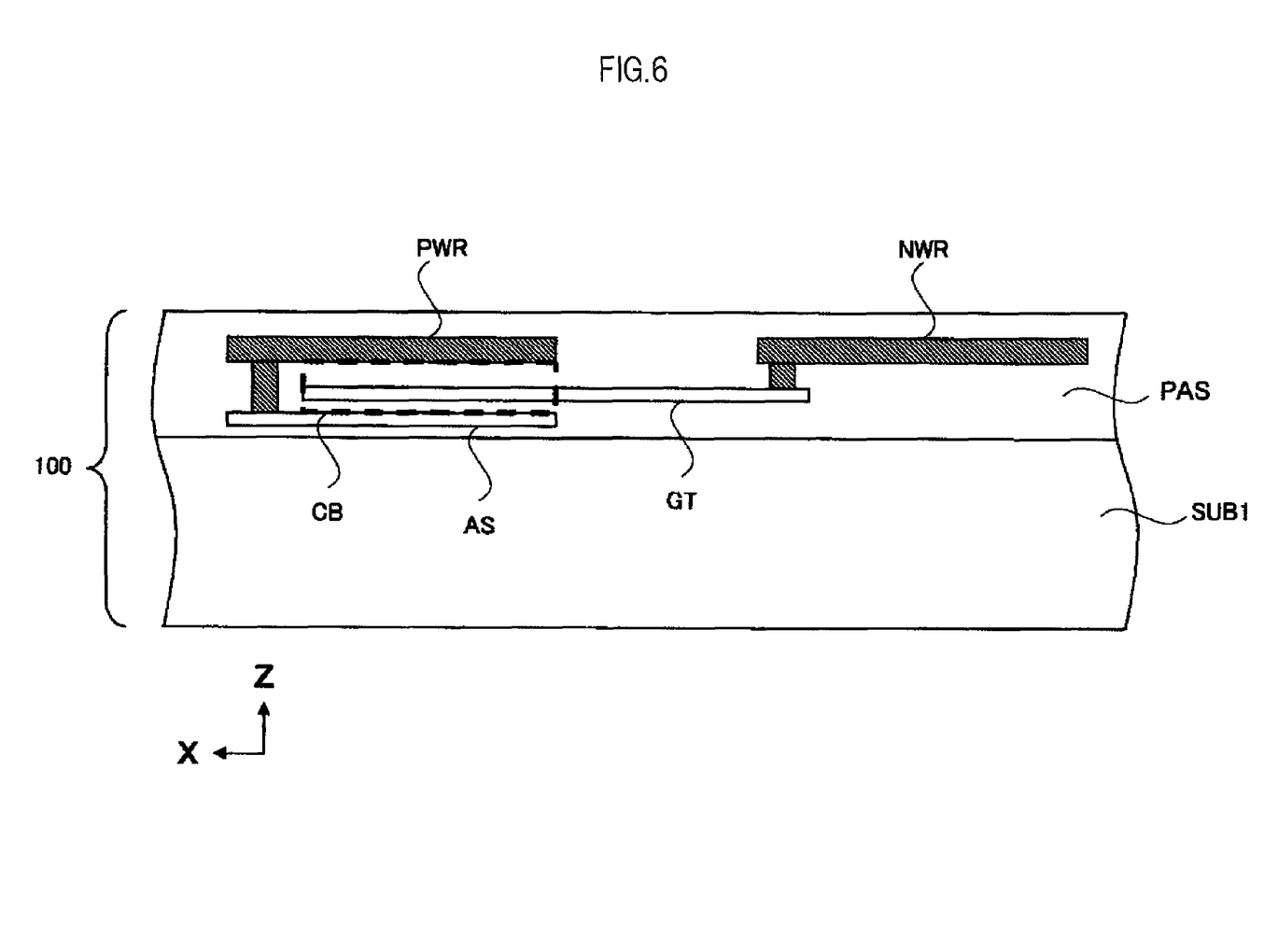
FIG. 6 is a cross sectional diagram illustrating a cross sectional structure of a main part, which is taken along a line C-C' of FIG. 3.

FIG. 6 is a cross sectional diagram illustrating a cross sectional structure of a main part, which is taken along a line C-C' of FIG. 3. Specifically, FIG. 6 is a cross sectional diagram of the panel board 100, which is taken along the line C-C' of FIG. 3. In FIG. 6, reference symbol SUB1 denotes the glass board of the panel board 100, and reference symbol PAS denotes the insulating layer.

Below the positive power supply line (PWR), a parallel capacitor (CB) is formed. The parallel capacitor (CB) includes a first capacitor formed by the positive power supply line (PWR) and the gate electrode layer (GT) that is connected to the negative power supply line (NWR), and a second capacitor formed by the gate electrode layer (CT) and the semiconductor layer (AS) that is connected to the positive power supply line (PWR). The first capacitor and the second capacitor are connected in parallel to each other.

The parallel capacitor (CB) functions as a bypass capacitor for connecting the positive power supply line (PWR) and the negative power supply line (NWR). When an unbalanced capacitance value between the capacitor (CP) and the capacitor (CM) generates a voltage between the positive power supply line (PWR) and the negative power supply line (NWR), the parallel capacitor (CB) operates so as to absorb the generated voltage. As described above, the capacitor (CP) is formed by the common electrode (ITO) provided on the transmission board 120 and the positive power supply line (PWR) provided on the panel board 100. The capacitor (CM) is formed by the common electrode (ITO) provided on the transmission board 120 and the negative power supply line (NWR) provided on the panel board 100.

It is preferable that a capacitance value of the parallel capacitor (CB) be larger than a capacitance value of the capacitor (CP) or a capacitance value of the capacitor (CM).

As described above, according to this embodiment, in the liquid crystal display device that adopts the communication method in which a signal (such as display data or display control signal) is transmitted/received with the use of electrostatic capacitance coupling, the common electrode provided on the board constituting the liquid crystal display panel is shared by peripheral circuits (data processing circuit (YDV) and scanning circuit (XDV)) and/or the power supply line of the pixel circuit. Therefore, the number of electrodes additionally required for one-channel non-contact transmission path can be only one. As a result, the increase in frame area caused along with the larger number of channels can be restrained to the minimum.

Moreover, the frame (non-display region) of the liquid crystal display panel is made smaller, with the result that flexibility of an application product can be enhanced.

It should be noted that, in the above-mentioned description, the embodiment in which the present invention is applied to the liquid crystal display device is exemplified, but the present invention is not limited thereto. The present invention is applicable to, for example, a general display device such as an organic EL display device. Moreover, the present invention is also applicable to a memory display device (for example, electronic paper) in which a memory material for storing a display state in the display panel is used.

Hereinabove, the invention made by the inventor of the present invention has been specifically described with reference to the embodiment. However, the present invention is not limited to the above-mentioned embodiment. It is obvious that various changes can be made without departing from the scope of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image display device comprising:
a display panel including a plurality of pixels; and
a second board,
wherein the display panel comprises a first board that is arranged so as to overlap the second board,
wherein the first board comprises:
a tabular first power supply line to which a voltage having a first voltage level is supplied;
a tabular second power supply line to which a voltage having a second voltage level that is different from the first voltage level is supplied;
a semiconductor element connected to the first power supply line and the second power supply line; and
a tabular first electrode group for transmitting/receiving a signal through electrostatic induction,
wherein the second board comprises:
a tabular second electrode group for transmitting/receiving a signal through electrostatic induction; and
a tabular common electrode to which a reference voltage of the signal is supplied, and
wherein, in a state where the first board and the second board are laid on each other, the first electrode group overlaps the second electrode group while one of the first power supply line and/or the second power supply line overlaps the common electrode.

2. An image display device according to claim 1, wherein the first board comprises a capacitor formed between the first power supply line and the second power supply line.

3. An image display device according to claim 2, wherein the capacitor is a parallel capacitor including:

a first capacitor formed by a semiconductor layer connected to one of the first power supply line and the second power supply line and a gate electrode layer connected to another one of the first power supply line and the second power supply line; and
a second capacitor formed by a metal layer for wiring including one of the first power supply line and the second power supply line and a gate electrode layer connected to another one of the first power supply line and the second power supply line,
the first capacitor and the second capacitor being connected in parallel to each other.

4. An image display device according to claim 1, wherein the display panel is an active matrix display panel.

5. An image display device according to claim 1, wherein the semiconductor element included in the first board is a thin film transistor using poly-silicon as a semiconductor layer.

6. An image display device according to claim 1, wherein the display panel is a liquid crystal display panel.

7. An image display device according to claim 1, wherein the display panel is an organic EL display panel.

8. An image display device according to claim 1, wherein the display panel is a memory display device.

9. An image display device according to claim 1,
wherein the first board comprises a driver circuit for driving the plurality of pixels, and
wherein the first power supply line and the second power supply line are a first power supply line for the driver circuit and a second power supply line for the driver circuit, respectively.

10. An image display device according to claim 1,
wherein each of the plurality of pixels comprises a pixel circuit formed on the first board, and
wherein the first power supply line and the second power supply line are a first power supply line for the pixel circuit and a second power supply line for the pixel circuit, respectively.

11. An image display device according to claim 1,
wherein the first power supply line is a positive power supply line, and
wherein the second power supply line is a negative power supply line.

* * * * *